Figure 1:
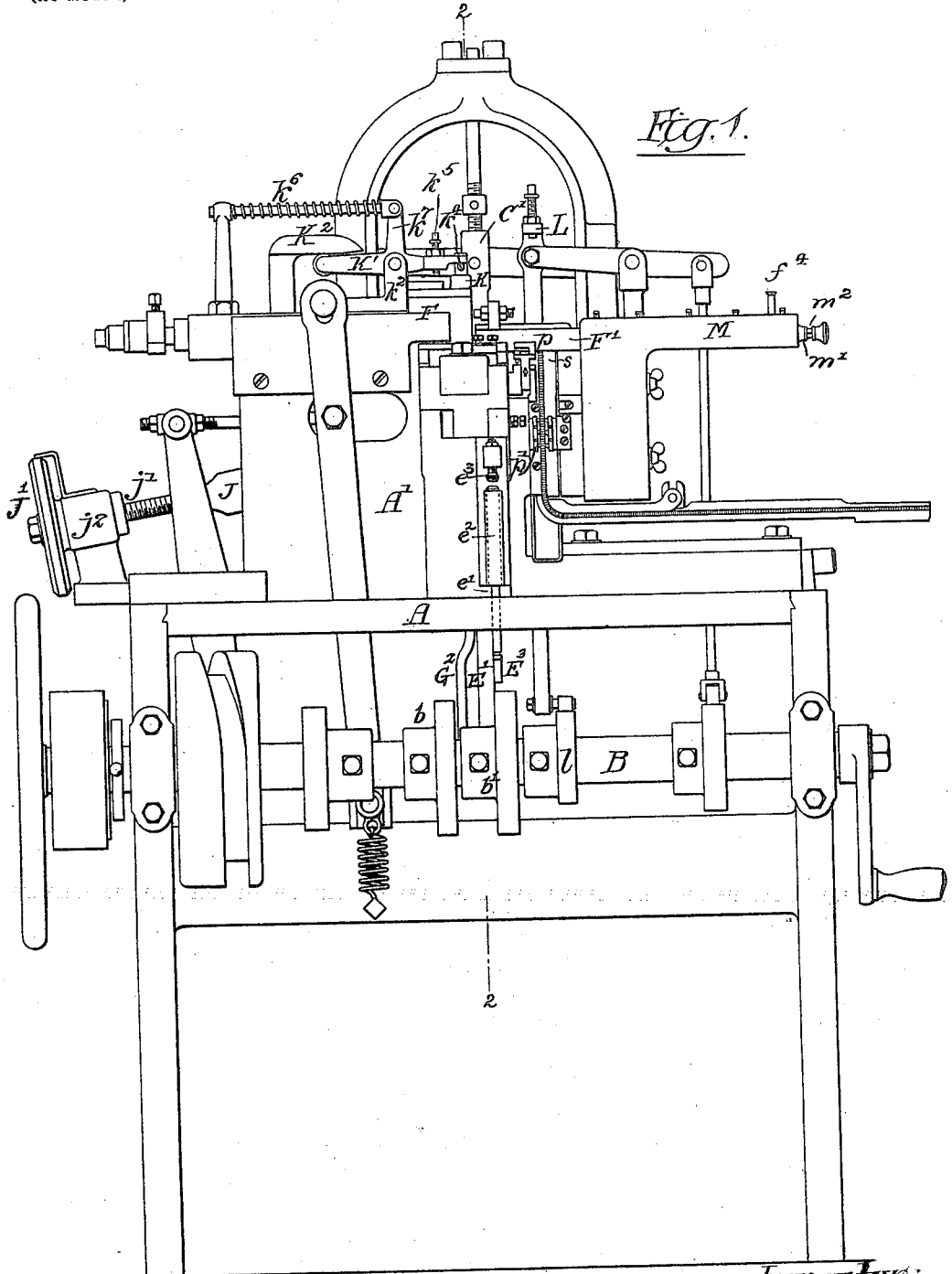

No. 678,831. Patented July 16, 1901.
G. H. ZIEGLER.
TYPE CASTING MACHINE.
(Application filed Feb. 17, 1900.)
(No Model.) 6 Sheets—Sheet 1.

Witnesses:—
Frank F. A. Graham
Louis M. Whitehead

Inventor:—
George H. Ziegler
by his Attorneys

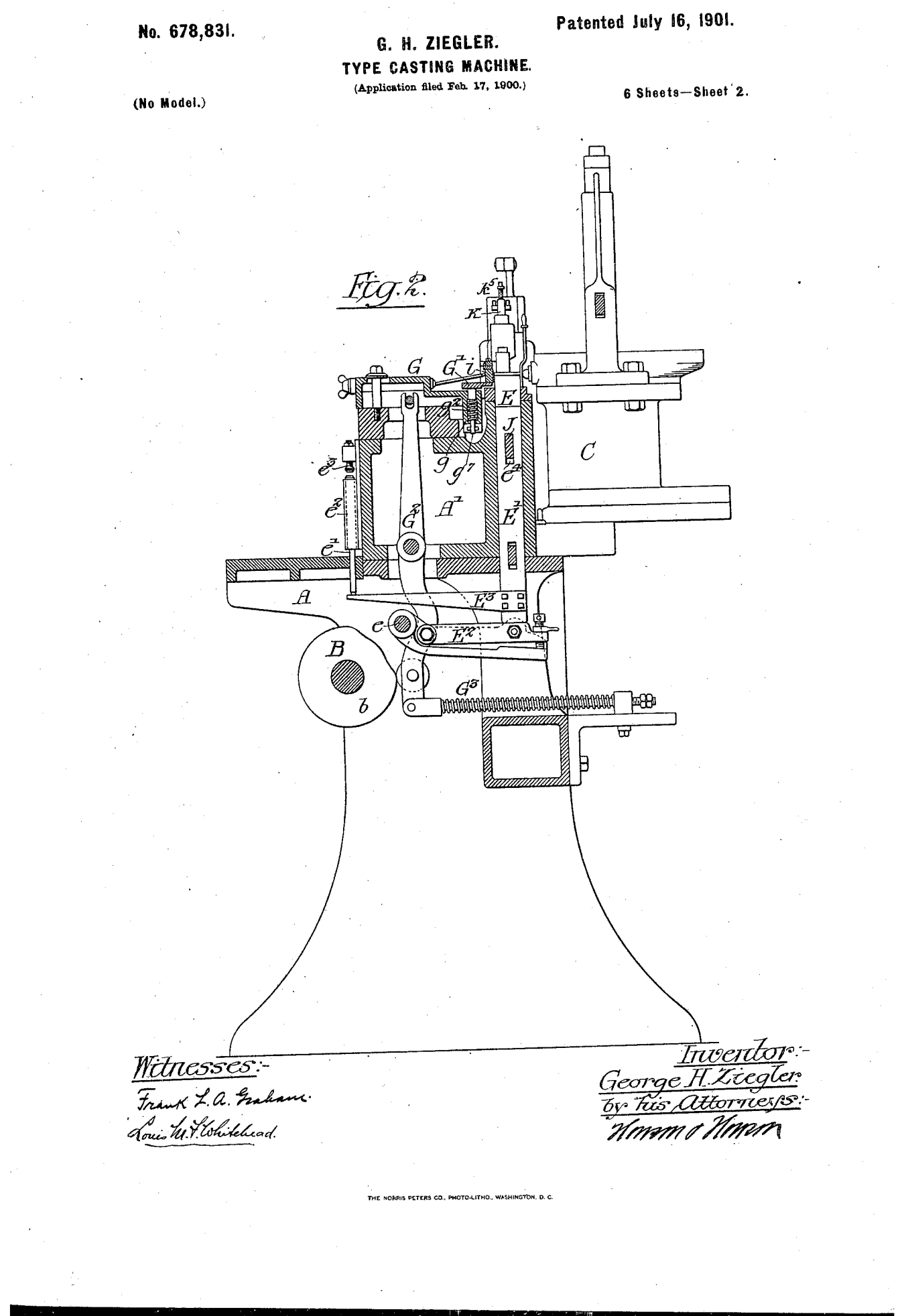

No. 678,831. Patented July 16, 1901.
G. H. ZIEGLER.
TYPE CASTING MACHINE.
(Application filed Feb. 17, 1900.)
(No Model.) 6 Sheets—Sheet 2.

No. 678,831. Patented July 16, 1901.
G. H. ZIEGLER.
TYPE CASTING MACHINE.
(Application filed Feb. 17, 1900.)
(No Model.) 6 Sheets—Sheet 3.
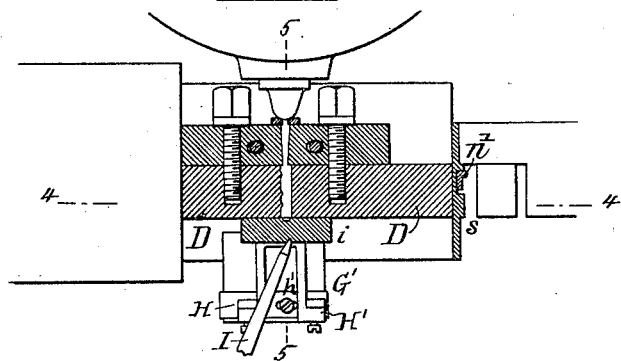
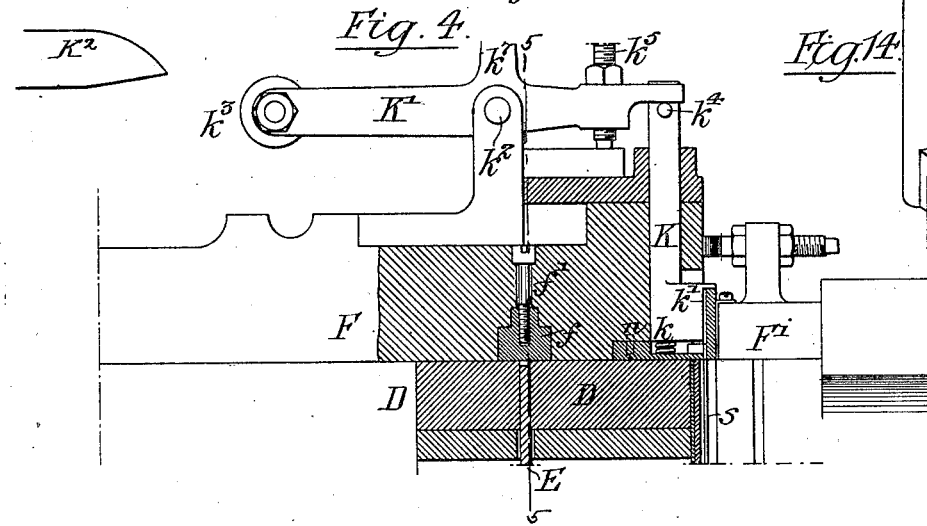
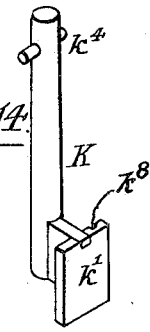
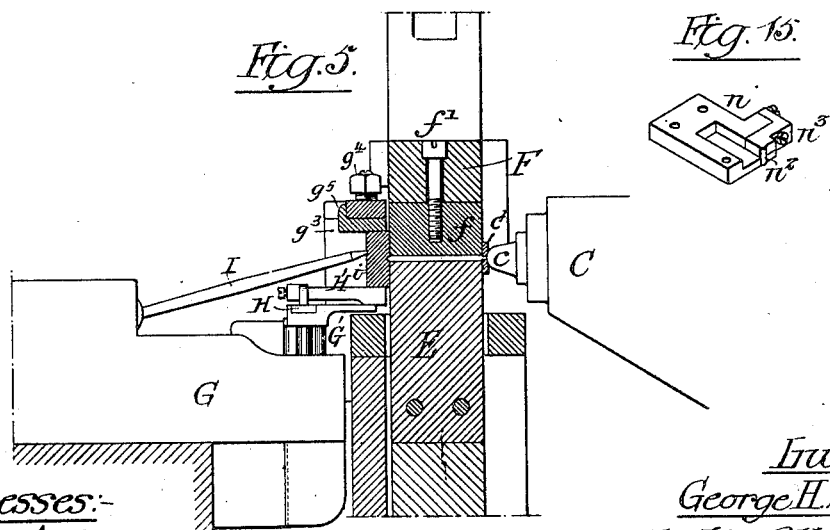
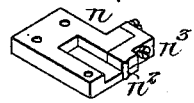
Witnesses:—
Inventor:
George H. Ziegler.
by his Attorneys

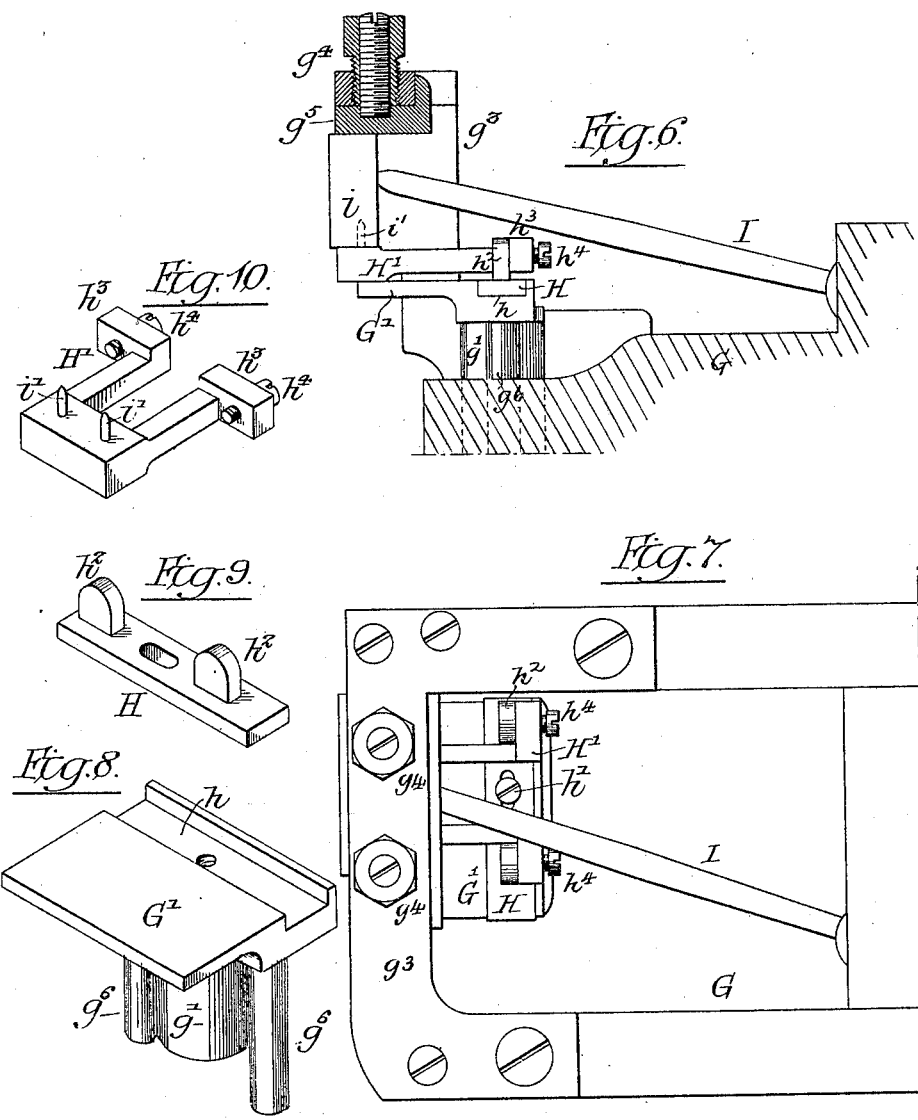

No. 678,831. Patented July 16, 1901.
G. H. ZIEGLER.
TYPE CASTING MACHINE.
(Application filed Feb. 17, 1900.)
(No Model.) 6 Sheets—Sheet 5.
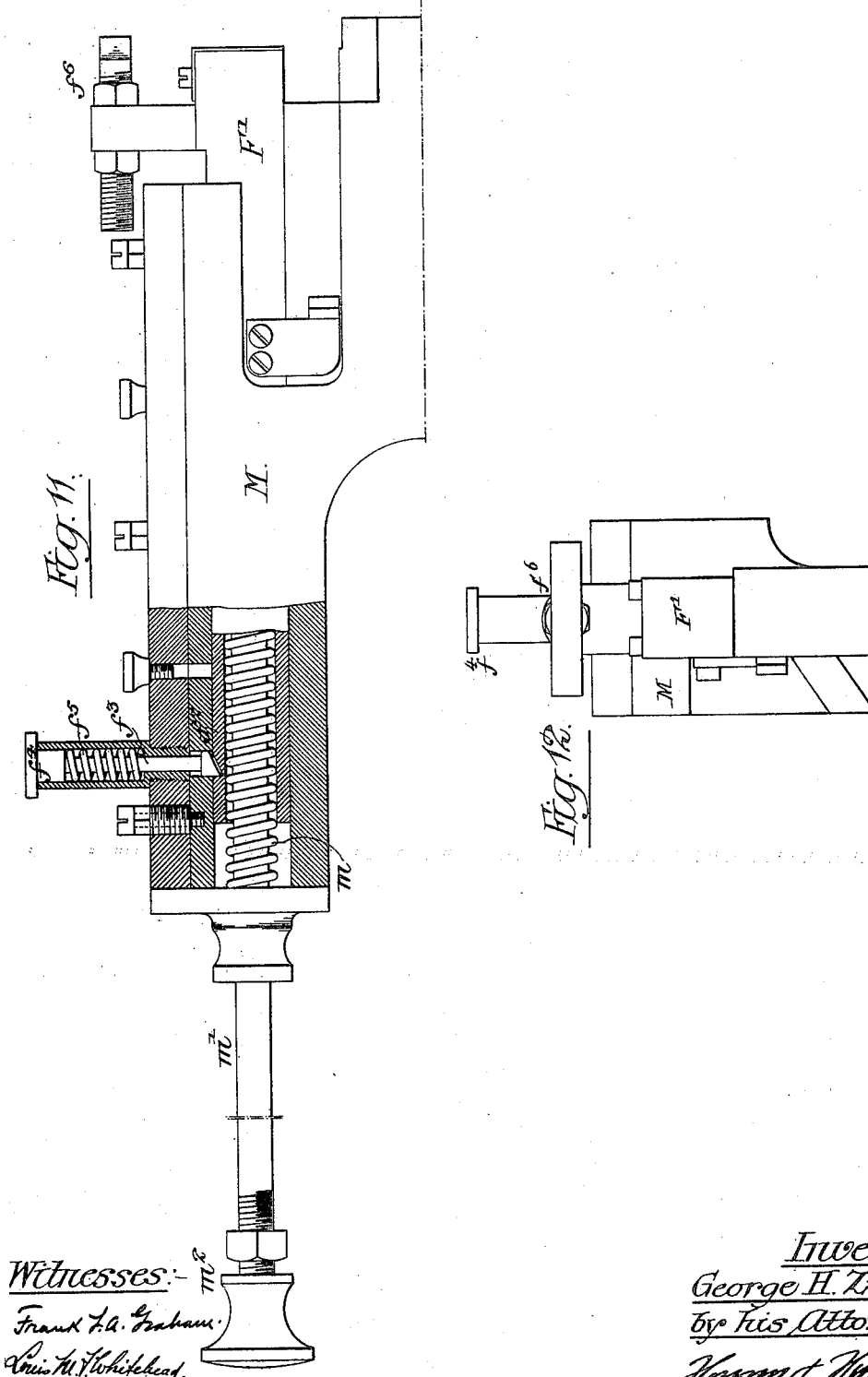
Witnesses:
Frank A. Graham
Louis M. Whitehead
Inventor:
George H. Ziegler
by his Attorneys

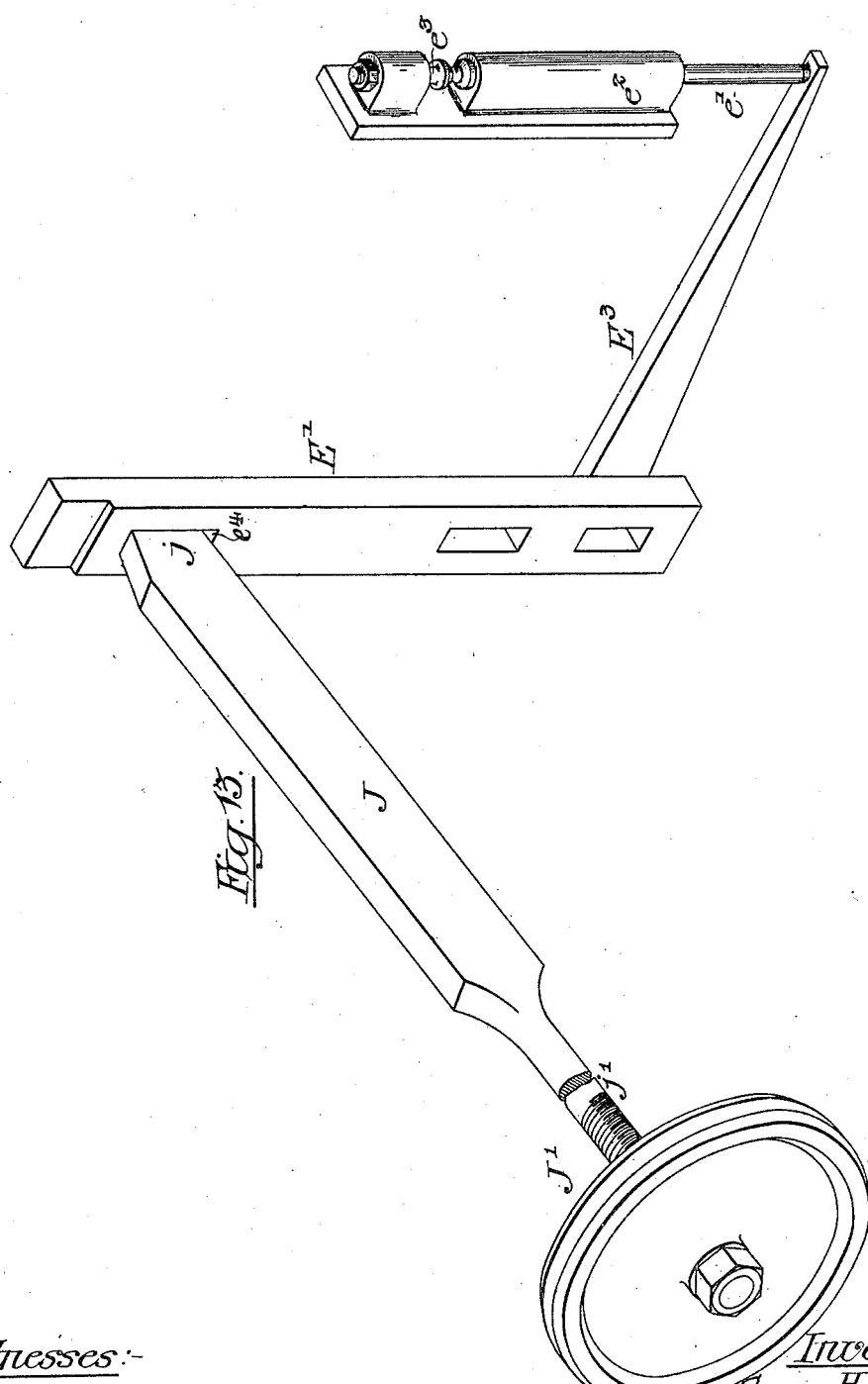

UNITED STATES PATENT OFFICE.

GEORGE H. ZIEGLER, OF PHILADELPHIA, PENNSYLVANIA, ASSIGNOR TO THE AMERICAN TYPE FOUNDERS' COMPANY, OF NEWARK, NEW JERSEY.

TYPE-CASTING MACHINE.

SPECIFICATION forming part of Letters Patent No. 678,831, dated July 16, 1901.

Application filed February 17, 1900. Serial No. 5,587. (No model.)

*To all whom it may concern:*

Be it known that I, GEORGE H. ZIEGLER, a citizen of the United States, residing in Philadelphia, Pennsylvania, have invented certain Improvements in Type-Casting Machines, of which the following is a specification.

My invention relates to certain improvements in type-casting machines in which the type is cast, dressed, and finished.

The object of my invention is to perfect the details of the machine illustrated and described in the Patent No. 376,765, of January 24, 1888, and in the application for patent, Serial No. 576,036, filed January 18, 1896. This object I attain in the following manner, reference being had to the accompanying drawings, in which—

Figure 1 is a front view of my improved type-casting machine. Fig. 2 is a transverse sectional view on the line 2 2, Fig. 1. Fig. 3 is a sectional plan view of the mold portion of the machine. Fig. 4 is a section on the line 4 4, Fig. 3. Fig. 5 is a section on the line 5 5, Fig. 4. Fig. 6 is an enlarged sectional view showing the matrix-holder. Fig. 7 is a plan view of the matrix-holder illustrated in Fig. 6. Figs. 8, 9, and 10 are detail views of the matrix-holder. Fig. 11 is a detail view of the rear carrier-plunger. Fig. 12 is an end view of Fig. 11. Fig. 13 is a view showing the means for adjusting the body-piece. Figs. 14 and 15 are perspective views of details of the mechanism shown in Fig. 4.

A is the base of the machine, having bearings for the shaft B, which can be either driven by hand or power. On the base is a frame A', carrying the moving parts of the machine.

C is a melting-pot for the type-metal, pivoted so as to swing clear of the operating parts of the machine when desired.

The mold for the type is formed by two side plates D D, Fig. 4, the body-piece E, and the plunger F. The body-piece is adapted to the space between the plates and acts as the bottom of the mold, and the sliding plunger F acts as the top of the mold and carries the type from the mold to the type-channel. Inserted in the bottom of the plunger is a block $f$, held by a screw $f'$. This block rests directly over the mold during the casting of the type, as clearly shown in Fig. 4. The nipple $c$ of the melting-pot fits against a perforated plate $c'$, Fig. 5, so that there is a tight joint between the mold and the melting-pot.

G is the matrix-carrier. This matrix-carrier is clearly shown in Figs. 6 to 10, inclusive, and slides upon the projection of the frame A' and has a pocket $g$, Fig. 2, at its forward end, in which rests a depending portion $g'$ of the table G', on which the matrix $i$ is clamped. Extending from the depending portion $g'$ is a rod $g^7$, around which is a spring $g^2$, tending to force the plate upward.

$g^3$ is a yoke secured to the matrix-carrier G. This yoke has double set-screws $g^4$, which carry the upper clamp-plate $g^5$.

On each side of the depending portion $g'$ of the table G' are guide-bars $g^6$, which enter holes in the matrix-carrier, so as to hold the table G' in position. The upper surface of the table G' is grooved at $h$, and adapted to this groove is a plate H, confined by a screw $h'$ to the table G'. The screw passes through the slot in the plate H, and the plate has two lugs $h^2$, as shown in Fig. 9.

H' is a U-shaped piece having two projections $h^3$, resting back of the lug $h^2$ of the plate H and provided with adjusting-screws $h^4$, which bear against the rear of the lugs. Projecting from the piece H' are two pins $i'$, which enter holes in the bottom of the matrix $i$, so that the matrix when in position is held from turning by these pins.

The matrix-carrier G is provided with the usual sprue I, which rests against the rear of the matrix and is adapted to a socket in the projection of the matrix-carrier, so that the sprue can adapt itself to different matrices.

The matrix-carrier G is actuated by a lever $G^2$, pivoted to the frame of the machine and acted upon by a cam $b$ on the shaft B. The cam in the present instance rests against a roller on the lever, and a spring $G^3$ tends to keep the roller against the cam, as clearly shown in Fig. 2.

The above-described matrix-carrier and its connected mechanism is fully described and claimed in an application for United States patent filed by me June 7, 1901, Serial No. 63,588.

E' is the slide to which the body-piece E is secured. This slide is adapted to guides in the frame of the machine and is operated by a lever E², acted upon by a cam $b'$ on the shaft B, Fig. 1. The lever E² is adjustable; but I do not claim the construction of this lever.

The slide is so set that its extreme upward movement will bring it flush with the top of the plates D D; but its downward movement is regulated by a wedge J, Fig. 13, the tapered end $j$ being adapted to an opening $e^4$ in the slide. The wedge is moved in and out by a handled nut J', adapted to the threaded end $j'$ of the wedge J, the nut being confined to the bracket $j^2$, projecting from the base of the machine, as clearly shown in Fig. 1.

In order to set the machine to cast a given type, it is necessary to accurately adjust the wedge J so that the space between the body-piece and the top of the mold when the body-piece is down will be the exact width of the type to be cast. To accomplish this quickly, I mount on the front of the machine a bracket $e^2$, in which slides a plunger $e'$, and in the bracket above the plunger is a headed set-screw $e^3$.

Projecting from the body-piece slide E' is an arm E³, which extends under the plunger $e'$, as shown in Figs. 2 and 13. When it is wished to set the mold to cast a type of a given thickness, a type or a blank of the thickness required is placed between the plunger $e'$ and set-screw $e^3$, and the wedge J is adjusted until the type or blank is gripped between the plunger and set-screw. Then the type or blank is removed and the machine is ready to cast type of the thickness required.

When the type is cast, the sliding plunger F moves back to allow the type to be projected up in front of it. As the plunger moves forward it pushes the type forward on the plate D to the channel $s$.

At the end of the plunger F is a clamp K, and secured to the plunger is a plate $n$, Fig. 15, which extends under the clamp, and between the plate and the clamp is a spring $k$, which tends to elevate the clamp. Secured to an arm projecting from the clamp is a plate $k'$, preferably the size of the type or smaller. The form of this plate is clearly shown in the perspective view, Fig. 14.

K' is a lever pivoted at $k^2$ to the sliding plunger F. This lever has a roller $k^3$, which passes under an arm K², beveled on the under side, and the other arm of this lever K' presses upon a pin $k^4$ on the clamp K.

$k^5$ is a set-screw for regulating the movement of the lever K'.

When the sliding plunger moves back, so as to allow the type to be projected from the mold, the roller $k^3$ passes under the arm K², relieving the clamp K from pressure of the spring $k^6$, and its spring $k$ will elevate it to allow the type to be raised clear of the mold. As soon as the plunger moves past the mold the lever K' moves from under the arm K², and the spring $k^6$, which acts upon the lever $k^7$, forces the clamp K down upon the type to hold the type rigidly until it passes to a position directly over the channel $s$. When the plunger is in this last position, the clamp K is forced down by a rod L, actuated by a cam $l$ on the shaft B. The clamp thus pushes the type into the channel $s$, clear of the sliding carrier, and moving forward all the type in the channel.

The type as it is moved forward is clamped between the sliding plunger F and the sliding plunger F', Fig. 11, this latter plunger being backed by a spring $m$ on a rod $m'$, attached to said plunger on a rod $m'$, so that as the plunger F moves forward it compresses the spring through the medium of the type and pushes the plunger F' within its box M. Thus the type is rigidly held while being carried from the mold to the channel. The rod $m'$ is secured to the rear end of the plunger F' and has a nut $m^2$ and a jam-nut at its outer end. On turning the nut $m^2$ the distance between the plungers F F' at the mold can be regulated, as when the plunger F' is forced forward by its spring $m$, as in Fig. 1, the nut $m^2$ strikes the end of the box M, and thus the movement of the plunger F' is limited, so that on adjusting the nut the space between the plungers will be increased or decreased. The plunger F' has a notch $f''$, with which engages a latch $f^3$, having a head $f^4$. Between this head and the casing for the latch is a comparatively light spring $f^5$, which tends to raise the latch.

When it is desired to withdraw the plunger F', all that is necessary is to draw it back the full distance and press upon the head $f^4$ of the latch, which will force the latch into the notch $f^2$ of the plunger. The pressure of the spring $m$ will cause the plunger to bear with sufficient force against the latch to hold it in engagement; but when it is desired to release the plunger all that is necessary is to pull upon it slightly and then release it, causing the latch to release itself from engagement with the plunger and allowing the plunger to move forward.

$f^6$ is an adjustable stop to limit the forward movement of the plunger F'.

The plate $n$ on the end of the plunger F has a projection $n^2$, Fig. 15, fitting one of the nicks in the type, and the plate $k'$ of the clamp K is notched at $k^8$, as shown in Fig. 14, to correspond with this nick, so that it will pass the projection $n^2$ when forcing the type into the channel, and there is a nick-guide $n'$ in the channel, which holds the type in proper position. I preferably make the plate $n$ as shown in Fig. 15, the projection $n^2$ being carried by an adjustable section $n^3$ of the plate $n$. Two edges of the type are dressed by cutter-plates $p\ p$ as the type is carried forward by the plungers F F' from the mold to the channel $s$, and the other two edges are dressed by cutters $p'$ as it passes through the channel $s$. At the back of the channel is the cutter which nicks the base of the type. These parts are the same as in the machine for which I have applied for Letters Patent of the United States, Serial No. 576,036, and need not be described in detail.

I claim as my invention—

1. The combination in a type-casting machine, of a mold, a body-piece, a slide carrying the body-piece, mechanism for operating the same, a piece projecting from the slide, a headed plunger supported independently of the body-piece-operating mechanism and constructed to be engaged by said projecting piece, a fixed head between which and the head of the plunger, a type or blank is placed, with means independent of the said projecting piece for regulating the position of the body-piece, substantially as described.

2. The combination in a type-casting machine, of a mold, a body-piece, a slide carrying the body-piece, mechanism for operating the same, a piece projecting from the slide, a headed plunger supported independently of the body-piece-operating mechanism, a fixed head between which and the head of the plunger, a type or blank is placed, an adjustable stop independent of the said plunger and of the projecting piece whereby the downward movement of the body-piece is limited, substantially as described.

3. The combination in a type-casting machine, of a mold, a body-piece adapted thereto and forming one side of the mold, a slide for the body-piece, a wedge adapted to adjust the body-piece, a nut for operating the wedge, a projecting arm on the slide, a plunger, and a projection on the frame between which and the plunger a type or blank is placed, the plunger in position to be actuated by the arm on the slide, substantially as described.

4. The combination in a type-casting machine, of a frame, a mold and two type-carrying plungers thereon, the plungers being constructed to receive type from the mold between them, a body-piece adapted to the mold, a spring back of one of the plungers, a latch adapted to engage with the said plunger, and a spring arranged to lift the latch, said spring being lighter than the spring of the plunger, substantially as described.

5. The combination in a type-casting machine, of a frame, a mold and two plungers supported thereon, a body-piece adapted to the mold, the said plungers being adapted to carry the type between them from the mold, a clamp operating in guides in the frame having a notched plate, and a channel having a nick-guide, the said clamp being constructed to force the type into the channel when it has been carried by the plungers to a point above the channel, the notch in said plate corresponding to the nick-guide, substantially as described.

6. The combination in a type-casting machine, of a mold, a plunger adapted to slide over the face of the mold, a plate secured to the front of the plunger, and a projection on said plate adapted to fit into one of the nicks of the type and hold it in position as it is moved forward by the plunger, substantially as described.

7. The combination in a type-casting machine, of a mold, a plunger adapted to move over the face of the mold, a plate $n$ secured to the front of the plunger, and an adjustable section $n^3$, secured to the plate and having a projection $n^2$ adapted to one of the nicks in the cast type, whereby the type is held in position as it is moved by the plunger, substantially as described.

8. The combination in a type-casting machine, of a frame, a mold adapted to cast nicked type, a body-piece adapted to the mold, a plunger constructed to move over the face of the mold and having a projection in front fitting in one of the nicks in the type, a second plunger between which and the first plunger the type is held, said plunger and the mold being supported on the frame, a clamp operating in guides on the frame for holding the type down on the same as it is carried forward by the plungers, a channel, a projection in the channel corresponding to the nick in the type, the clamp being nicked so as to pass the projection on the end of the plunger and means for operating the clamp to force the type from between the plungers into the channel, substantially as described.

In testimony whereof I have signed my name to this specification in the presence of two subscribing witnesses.

GEORGE H. ZIEGLER.

Witnesses:
WILL A. BARR,
JOS. H. KLEIN.